Jan. 19, 1932.  L. V. ARONSON  1,841,776
REFRIGERANT
Filed Jan. 30, 1929

INVENTOR
Louis V. Aronson
BY
ATTORNEYS

Patented Jan. 19, 1932

1,841,776

UNITED STATES PATENT OFFICE

LOUIS V. ARONSON, OF NEWARK, NEW JERSEY, ASSIGNOR TO ART METAL WORKS, INC., A CORPORATION OF NEW JERSEY

REFRIGERANT

Application filed January 30, 1929. Serial No. 336,121.

This invention relates to a form of refrigerant. It is more particularly directed to a refrigerating capsule for use with a device such as described in my copending application Ser. No. 303,278, filed August 31, 1928, of which this application is a continuation in part. It is, however, not restricted to use with the device there shown.

One of the objects of the invention is to provide a form of refrigerant which can be easily handled and kept in condition without deterioration. Another object is to provide an article of this kind which will permit cooling to occur gradually.

Further and more specific objects, features and advantages will more clearly appear from the detail description given below taken in connection with the accompanying sheet of drawings which forms a part of this specification.

Figure 1:
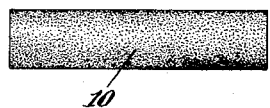
Figure 2:
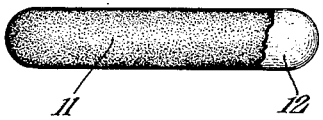
Figure 3:
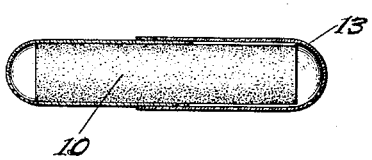

In the drawings, Fig. 1 shows a stick of refrigerant for insertion in its outside covering or capsule;

Fig. 2 shows a stick of refrigerant with a capsule of gelatin or other suitable water soluble material; and Fig. 3 shows a stick like that in Fig. 1 with a covering of water insoluble material such as a viscose material as cellophane.

The form of invention which I now consider to be the preferred one consists of a stick of refrigerant material 11 (Fig. 2) having rounded ends and covered by a coating of gelatin or similar material 12 which will dissolve when the capsule is placed in water and dissolves to allow the refrigerant to act. The refrigerant material consists of a suitable solid which when dissolved in water will produce a refrigerating effect.

The formulæ which I consider best adapted for refrigerating purposes are as follows:—

1. Ammonium sulfocyanide 40 parts, and ammonium nitrate 60 parts;
2. Calcium chloride;
3. Ammonium nitrate 40 parts, and sodium carbonate 60 parts.

These refrigerating materials are all solids and are ground to powder if not already in such form and compressed to form coherent masses or sticks of the material as herein shown. I prefer to compress the material under heavy pressure into the form of sticks because in this form it is more readily handled and particularly because when compressed the refrigerant material is less readily soluble in the water used to produce the refrigerating effect. In consequence the heat exchange which occurs as the refrigerant goes into solution takes place more slowly and uniformly than would be the case where the material is in the ordinary form.

After preparation of the stick it may be encased in a gelatine capsule 12 and is then ready to use. The capsule may be formed by dipping the mass in gelatin solution or may be preformed and applied. When it is desired to produce the refrigerating effect, for example, in my massage device shown in my copending application mentioned above, the capsule is dropped inside the device and sufficient water is added to cause solution of the gelatin and refrigerant to produce the desired effect.

The form shown in Figs. 1 and 3 comprises a stick of compressed material with flattened ends, which is encased in a water-proof casing 13 of cellophane or similar material. When the device is to be used the casing 13 is removed and a stick placed inside the receptacle to be cooled, whereupon water is added to give the desired refrigerating effect.

While I have described my preferred embodiment in the form of a stick of material, other easily handable forms such as tubes, lozenges or spheres may be also used.

The form of refrigerant contained in the capsule made according to my invention protects the refrigerant material against moisture and damp air. This is true especially of the water insoluble capsule, but applies also to some extent to the gelatin capsule. These capsules also protect the hands of the user from becoming soiled by the refrigerant material. Thus after contacting with the capsule the hands of the user may handle foods or beverages without danger of contamination or may come in contact with the skin of a patient for massage without soiling it.

While I have described my improvements in great detail and with respect to a preferred form thereof, I do not desire to be limited to such details and forms since many changes and modifications may be made and the invention embodied in widely different forms without departing from the spirit and scope thereof in its broader aspects. Hence I desire to cover all modifications, forms and embodiments coming within the language or scope of any one or more of the appended claims.

What I claim as new and desire to secure by Letters Patent, is:—

A mass of compressed refrigerating material consisting of a water soluble cold producing solid contained in a water soluble capsule.

In testimony whereof I have signed my name to this specification.

LOUIS V. ARONSON.